April 29, 1952  C. B. AMSTUTZ  2,594,532
BORING BAR HOLDER
Filed July 15, 1947
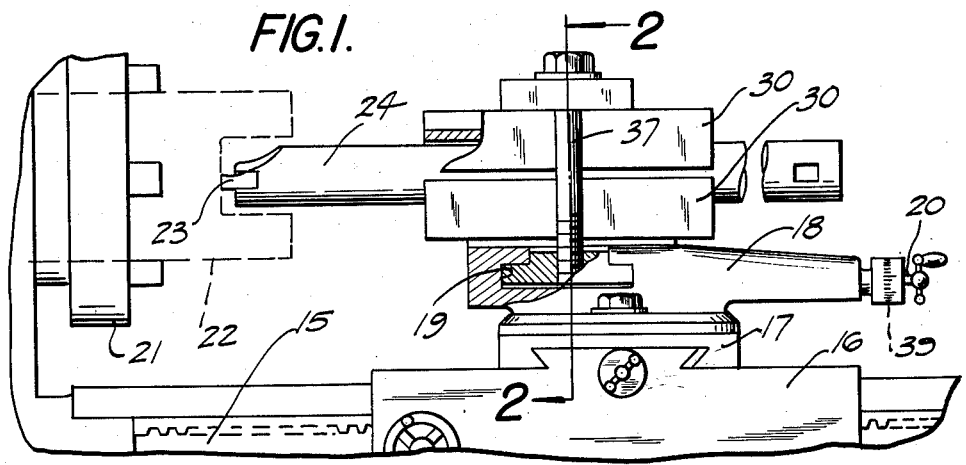
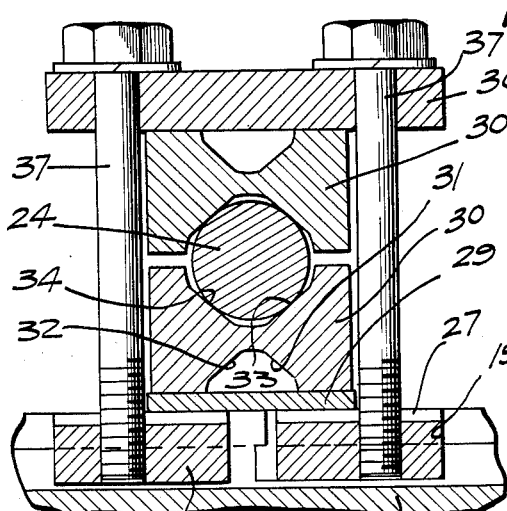
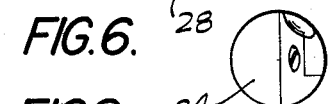
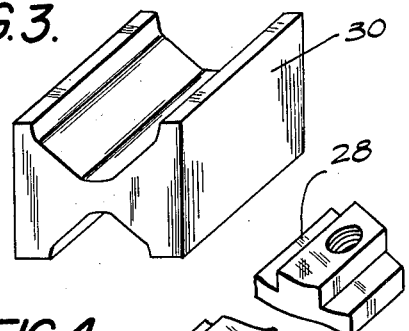
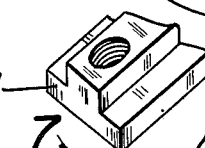
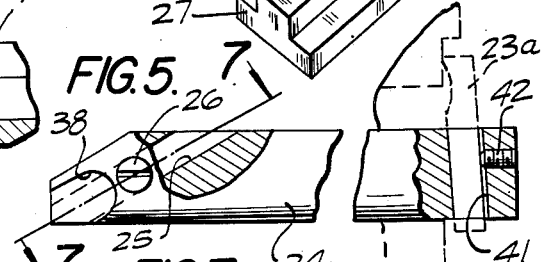
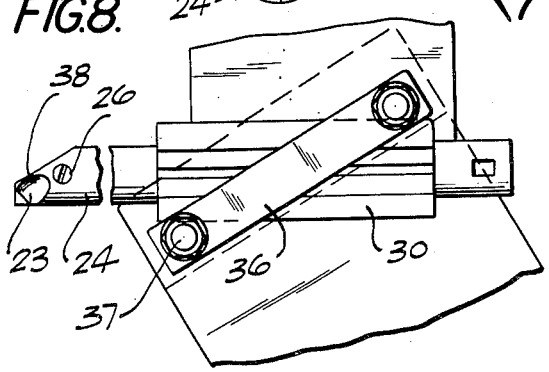
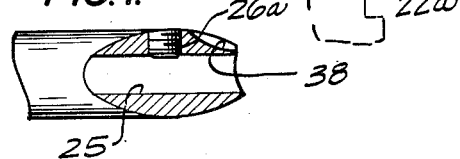
INVENTOR.
CHRISTIAN B. AMSTUTZ.
BY
ATTORNEY.

Patented Apr. 29, 1952

2,594,532

UNITED STATES PATENT OFFICE 2,594,532

BORING BAR HOLDER

Christian B. Amstutz, Clawson, Mich.

Application July 15, 1947, Serial No. 760,987

2 Claims. (Cl. 82—37)

1

My invention relates to a new and useful improvement in a boring bar and holder and has for its object the provision in a construction of this type of a holding device so arranged and constructed that vibration will be reduced to a minimum and the boring bar will be held rigid in its operation.

Another object of the invention is the provision of a boring bar holder so arranged and constructed that when mounted on the lathe compound tool holder, the lathe compound may be set at an angle to extend parallel with the ways of the lathe, thus considerably increasing the bearing surface against which the tilting strain of the boring bar would be directed.

Another object of the invention is the provision of a boring bar holder so constructed and arranged that it may be easily and quickly arranged to be used on lathes of different sizes without necessitating the use of finely graduated or developed adjustment mechanisms.

Another object of the invention is the provision of a boring bar holder so arranged and constructed that the use of a micrometer stop may be dispensed with and the dial on the compound used for finishing operations.

Another object of the invention is the provision of a boring bar holder so arranged and constructed as to effect a tight grip on the boring bar and prevent creeping or slipping of the boring bar.

Another object of the invention is the provision of a boring bar holder so arranged and constructed that a maximum economy in operation is effected, particularly, in transferring the boring bar holder from a lathe of one size to a lathe of another size.

Another object of the invention is the provision of a boring bar holder so arranged and constructed that efficient outside turning of large diameter beyond the capacity of the tool post and the tool holder can be performed with the same results, as well as, turning close to the face plate of the lathe chuck.

Another object of the invention is the provision of a boring bar having a tool bit extended at an angle thereto so as to reduce the side leverage and provided with a path for continuing the flow of chips or borings.

Other objects will appear hereinafter.

It is recognized that various modifications and changes may be made in the detail of structure illustrated without departing from the invention itself and it is intended that such shall be embraced within the scope of the claims which form a part hereof.

2

Forming a part of this specification are drawings in which,

Fig. 1 is a side elevational view of the invention showing it applied with parts broken away and parts shown in section, Fig. 2 is a fragmentary, sectional view taken on line 2—2 of Fig. 1, Fig. 3 is a perspective view of one of the clamping blocks used in the invention, Fig. 4 is a perspective view of the nut-forming plates used in the invention, Fig. 5 is a side elevational view of the boring bar with parts broken away and parts shown in section, Fig. 6 is an end elevational view of the boring bar, Fig. 7 is a fragmentary, sectional view of the end of the boring bar taken centrally therethrough and particularly on line 7—7 of Fig. 5, Fig. 8 is a top plan view of a setting of the holder with a part of the boring bar broken away, showing its position of use when, as a 30 degree angle, used for the reading.

In the drawings, I have illustrated an invention used with a lathe having a bed 15 and a slidable carriage 16 on which is mounted a cross slide 17 which serves as a support for the tool compound 18 which is formed with a T-slot 19. This late compound is provided with the rotatable screw 20 whereby the tool supporting member or compound may be moved toward or away from the face plate or chuck, this movement being indicated by the dial 39. The lathe is provided with the rotatable chuck 21 in which is secured the work-piece 22.

A tool bit 23 is indicated as mounted in the boring bar 24 there being a passage 25 formed diagonally through the boring bar 24 for reception of the bit 23, this passage being extended preferably at an angle of 33 degrees so as to project the tool bit outwardly and forwardly of the end of the boring bar 24. The tool bit is held in position by the set screw 26 which is threaded into the threaded opening 26a. At the end of the passage 25 is a cut-away pocket or recess 38 which forms a clearance or path for the blow of the cuttings so that the chips constantly flow away from cutting end of the bit 23 and there is no clogging or interference with the operation.

Positioned in the T-slot 19 of the compound are the nut-forming plates 27 and 28 which are provided with threaded openings for the reception of hold down bolts 37 which extend through openings in the presser plate 36. These nut-forming plates 27 lie slightly below the upper face of the compound 18. Clamping blocks 30 are provided which are used in pairs and each of which is constructed similar to the other so the description of one will suffice for both. In use, the lower block 30 may rest upon the face of the compound. However, when moving the holder from one size lathe to another, it will be necessary, in order that the center may be properly obtained, to use spacing plates or shims and in Fig. 2, I have indicated a shim or spacing plate 29 positioned below the lower block 30. By the use of these spacing plates, the holder may be used on any size lathe and it is not necessary to have different clamping blocks for different size lathes.

Co-operating with the clamping block 30 is the upper clamping block 30' which is a duplicate of the clamping block 30 and which has in its opposed face the same formation which appears in the opposed face of the clamping block 30. Formed in the under face of the block 30 is a recess extending the length of this block and having the planar faces 31 and 32 which engage against the periphery of the boring bar 24. Similarly, on the other face of the block 30 is formed a recess extending the full length thereof and in which the boring bar engages, this recess or groove having the planar faces 33 and 34 which are adapted to engage against the periphery of the boring bar 24 which is to be clamped thereby. An examination of the structure shown in Fig. 2 will indicate that boring bars of different sizes may be clamped between the blocks 30 and 30' when they are not in the position shown in Fig. 2. However, a variation in the size of the boring bar will raise or lower the structure thereof depending upon whether the boring bar is larger or smaller and this would require the changing of the plate 29 and the use of a different thickness of the plate 29 in order that the boring bar may be properly centered relatively onto the lathe it is to be used.

The grooves or the recess formed in these blocks 30 or 30' are of different sizes, the grooves or recesses designed to take the larger size boring bar being shown in use in Fig. 2. Were these blocks to be reversed so that the opposite faces would be opposed and a boring bar of proper size positioned in the receiving opposed grooves, this boring bar would be centered inasmuch as the grooves designed for a larger boring bar are deeper than the grooves designed for a smaller boring bar and proceed further inwardly from the face in which formed.

It will be noted that the blocks 30 and 30' are elongated so as to contact a considerable portion of the length of the boring bar 24. As shown in Fig. 1, the compound is extended parallel to the lathe bed, thus presenting the maximum service for resisting tilting thrust on the boring bar and affording a rigid, durable mounting for the boring bar and one which has proven most efficient. Since, as shown in Fig. 1, the compound is turned to parallel the lathe bed, the use of a micrometer stop in a boring operation is not necessary as the operator can, when about to finish the boring operation, determine the depth that the boring operation has yet to proceed and then by using the screw 20 and cooperating with the dial 39 determine the distance of movement, thus adding considerably to the efficiency of the mechanism as a whole.

In Fig. 8, I have indicated the plate 36 extended at an angle to the longitudinal axis of the boring bar, thus making it possible to securely retain the boring bar in position when extended at the desired angles for threading.

In Fig. 5, I have shown the bar 24 extended at its rear end through the work-piece and provided with a bit 23a held in the slot 41 by the set screw 42 for back facing. This is a very desirable feature in a boring bar, especially where close work and very accurate dimensions are required.

Experience has shown that with a boring bar holder of this type an economy in operation is effected particularly in providing a boring bar for universal purposes. Instead of having a boring bar holder for each size boring bar and instead of having a fixed or special equipment for each size work-piece or lathe on which the boring operation is had, the present operation may be adapted for various size boring bars and various size lathes, thus considerably reducing the outlay of money on special equipment for different sizes. It will be noted also that the structure is such that the boring bar may be used for outside turning and that it may be moved up into close approach to the chuck or face plate without losing any of the advantages of rigidity and lack of vibration. This rigidity is present particularly when the compound is turned parallel to the ways of the lathe bed. Due to the length of the boring bar, which is gripped by the clamping or gripping blocks, the rigidity is also enhanced.

What I claim as new is:

1. A boring bar clamping device of the class described adapted for use with a lathe having a compound provided with a body rotatably mounted relatively to a lathe bed, comprising: a pair of nut forming plates slidable in a slot formed in the compound body and having a threaded opening therethrough for reception of one end of a bolt; a pair of duplicate clamping blocks, each having a boring bar receiving groove formed in the face opposed to the face of the other and provided with a pair of diagonally extended planar surfaces for engaging the periphery of a boring bar; a presser plate extended across said clamping blocks transversely thereof and projecting beyond opposite sides thereof and provided with openings for reception of a bolt; a bolt projected through each of said openings and threaded into said nut-forming plates for clamping said clamping blocks in clamping relation to a boring bar.

2. A boring bar clamping device of the class described adapted for use with a lathe having a compound provided with a body rotatably mounted relatively to a lathe bed, comprising: a pair of nut forming plates slidable in a slot formed in the compound body and having a threaded opening therethrough for reception of one end of a bolt; a pair of duplicate clamping blocks, each having a boring bar receiving groove formed in the face opposed to the face of the other and provided with a pair of diagonally extended planar surfaces for engaging the periphery of a boring bar; a presser plate extended across said clamping blocks transversely thereof and projecting beyond opposite sides thereof and provided with openings for reception of a bolt; a bolt projecting through each of said openings and threaded into said nut-forming plates for clamping said clamping blocks in clamping relation to a boring bar; and an adjusting plate positioned between the lower of said clamping blocks and the upper face of the body of said compound for centering the boring bar relatively to the lathe with which used.

CHRISTIAN B. AMSTUTZ.

(References on following page)

REFERENCES CITED

The following references are of record in the file of this patent:

UNITED STATES PATENTS

| Number | Name | Date |
|---|---|---|
| 17,814 | Whiton | July 14, 1857 |
| 294,736 | Hyle | Mar. 4, 1884 |
| 565,425 | Bolte | Aug. 11, 1896 |
| 908,804 | Rhoades | Jan. 5, 1909 |
| 911,999 | Krieger | Feb. 3, 1909 |
| 1,014,412 | Palmgren | Jan. 9, 1912 |
| 1,083,230 | Taylor | Dec. 30, 1913 |
| 1,262,781 | Gross | Apr. 16, 1918 |
| 1,326,804 | Taylor | Dec. 30, 1919 |
| 1,453,018 | McHewitt | Apr. 24, 1923 |
| 1,582,077 | Palmer | Apr. 27, 1926 |
| 1,818,501 | Odin | Aug. 11, 1931 |
| 2,078,475 | Welter | Apr. 27, 1937 |
| 2,188,198 | Bredenbeck | Jan. 23, 1940 |
| 2,293,680 | Beyreis | Aug. 18, 1942 |
| 2,333,228 | Barrett | Nov. 2, 1943 |
| 2,356,591 | Jesionowski | Aug. 22, 1944 |
| 2,421,200 | Hall | May 27, 1947 |